United States Patent

[11] 3,624,770

| [72] | Inventors | Saburo Fujita;<br>Keizo Yasui, both of Kariya, Japan |
|---|---|---|
| [21] | Appl. No. | 848,045 |
| [22] | Filed | Aug. 6, 1969 |
| [45] | Patented | Nov. 30, 1971 |
| [73] | Assignee | Aisin Seiki Kabushiki Kaisha<br>Kariya, Japan |
| [32] | Priority | Aug. 11, 1968 |
| [33] | | Japan |
| [31] | | 43/56833 |

[54] CLUTCH DISC
3 Claims, 8 Drawing Figs.

[52] U.S. Cl. ............... 192/52, 192/107 C
[51] Int. Cl. ............... F16d 13/46, F16d 13/64
[50] Field of Search ............... 192/107, 107 C, 52; 188/218 A, 216

[56] References Cited

UNITED STATES PATENTS

| 1,571,747 | 2/1926 | Wemp ............... | 192/107 C |
| 3,213,988 | 10/1965 | Maurice et al. ............... | 192/107 C X |

FOREIGN PATENTS

| 412,763 | 7/1934 | Great Britain ............... | 192/107 C |
| 872,676 | 7/1961 | Great Britain ............... | 192/107 |

*Primary Examiner*—Allan D. Herrmann
*Attorney*—Pierce, Scheffler & Parker

ABSTRACT: A clutch disc for use on an automotive vehicle, wherein a pair of friction facings provided between a pressure plate and a flywheel are inclined towards the pressure plate in a disengaging position by means of inclined leaf springs or disc plate, so that when the clutch is being disengaged the frictional facings are rapidly released from the rotating members without any drag.

PATENTED NOV 30 1971

INVENTORS
Saburo Fujita
Keizo Yasui

BY Pierce, Schiffler & Parker
ATTORNEYS

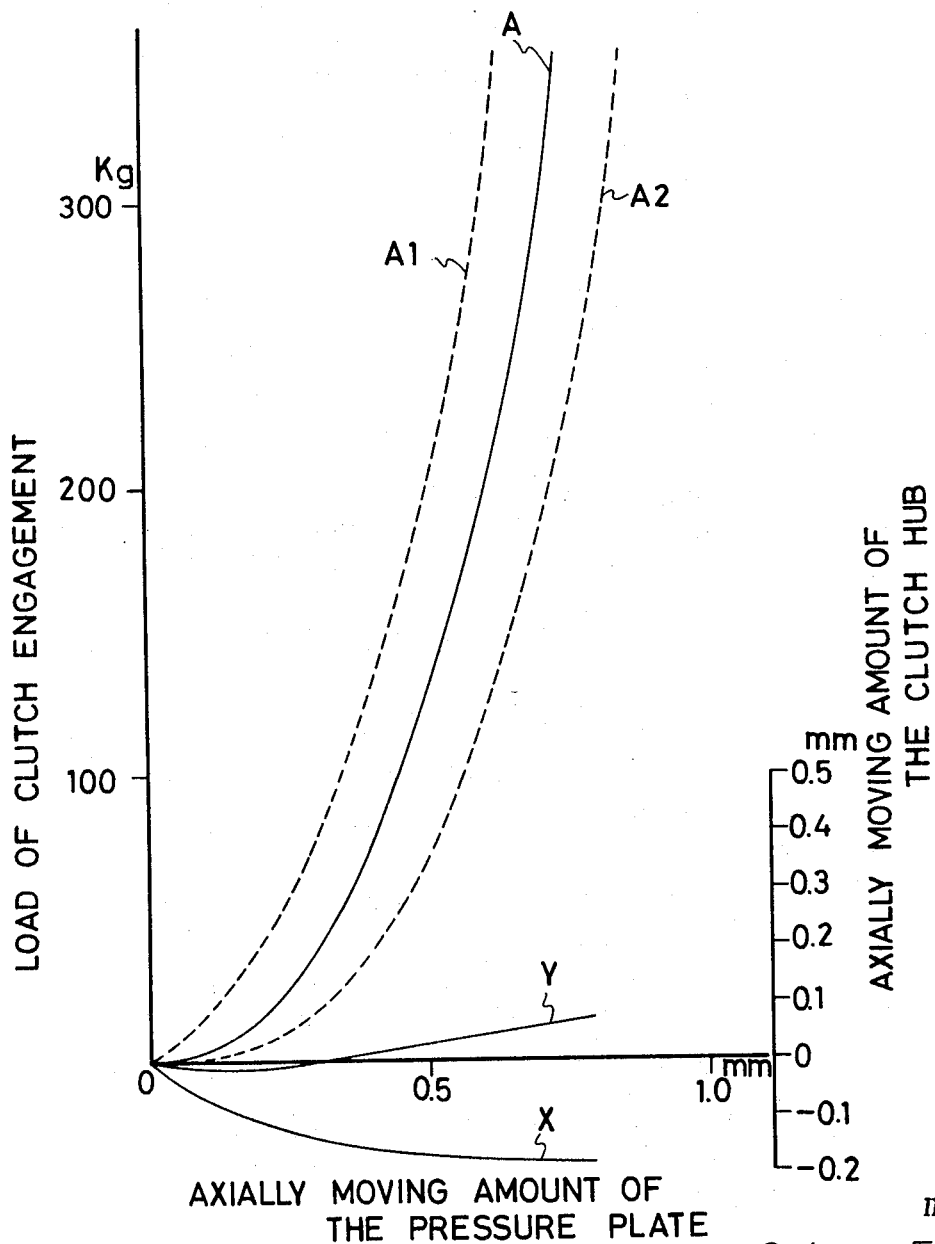

CLUTCH DISC

BACKGROUND OF THE INVENTION

This invention relates to improvements in clutch discs, and more particularly to clutch discs of the cushion type for use in motor vehicles.

It is desirable that disengagement of the clutch disc be accomplished quickly without any drag. In conventional clutch discs, however, when clutch is engaged, a hub is forced to move excessively towards a flywheel due to friction facings having irregular surfaces and leaf springs having elasticity, and when clutch is disengaged, consequently, the hub is necessary to move excessively towards a pressure plate against sliding resistance between a splined bore of the hub and a corresponding splined portion of a drive shaft.

When the sliding resistance therebetween is stronger than returning force of the hub, the trailing torque is generated between the flywheel and one friction facing, not to accomplish the disengagement of the clutch disc.

SUMMARY OF THE INVENTION

It is a principal object of the present invention to overcome the above-mentioned difficulty in the prior art by providing an improved clutch disc.

According to this invention, briefly summarized, there is provided frictional facings inclined in the direction of the pressure plate by means of inclined leaf springs or an inclined disc plate, so that the frictional facings be rapidly released of themselves from the frictional surface of the flywheel, and the sliding resistance between the hub and transmission drive shaft be more decreased than heretofore.

Further objects and advantages of the present invention will be apparent from the following description, reference being had to the accompanying drawings wherein preferred embodiments of the present invention are clearly shown.

BRIEF DESCRIPTION OF THE DRAWINGS

In the drawings:

FIG. 8 is a diagram showing the axially moving amount of the clutch hub according to this invention (Y), compared with that of the conventional one (X), and further illustrating the load curve of the leaf springs (A).

DETAILED DESCRIPTION

Figure 1:
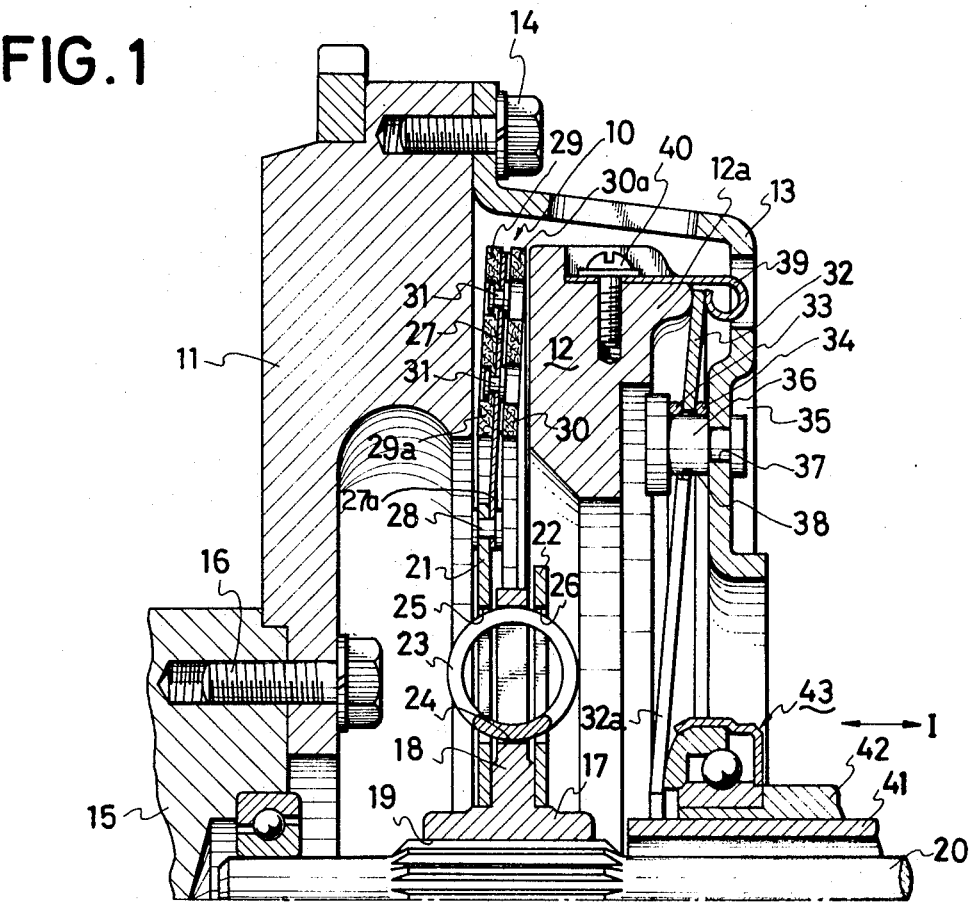
FIG. 1 is a partial side view in section of the clutch assembly including the clutch disc according to the present invention, the clutch disc is in a disengaged position.

Referring to the drawings, especially FIGS. 1 to 5 thereof, a clutch disc assembly 10 is arranged between a flywheel 11 and a pressure plate 12 drivingly mounted on a clutch cover 13. The flywheel 11 and clutch cover 13 are rigidly connected to each other by fixing bolts 14 and rotate with an engine (not shown) through a crankshaft 15 rigidly mounted on the flywheel 11 by fixing bolts 16.

The clutch disc 10 comprises a hub 17 having a flange 18 extending radially outwardly therefrom, said hub 17 having therein a splined bore 19 whereby the clutch disc 10 is drivingly mounted on a transmission drive shaft 10 and is adapted for sliding movement longitudinally thereon.

Figure 2:
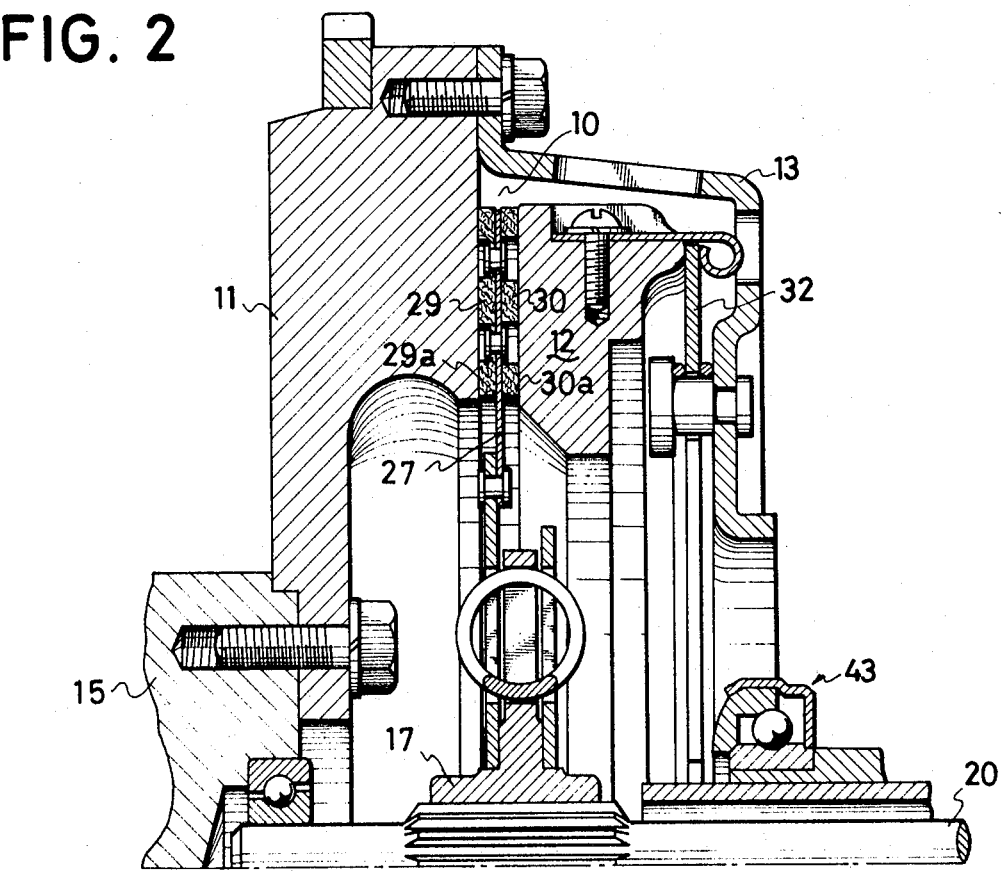
FIG. 2 is a view similar to FIG. 1, the clutch disc is in an engaged position.

At one side of the flange 18, there is provided a disc plate 21 which extends radially outwardly from the hub 17 to beyond the outer periphery of said flange 18 as shown in FIG. 1 or 2.

At the other side of said flange 18, there is provided a parallel ring 22 extending outwardly from the hub 17 to adjacent the outer periphery of said flange 18.

There are some torsion dampers 23 for providing a flexible or yieldable driving connection between the disc plate 21 and the hub 17. Said dampers 23 made of such materials as rubber, are seated in openings 24 in the hub flange 18 and also in openings 25 and 26 in the disc plate 21 and parallel ring 22, respectively. Both of the plate 21 and parallel ring 22 are connected to each other by a plurality of stopper pins (not shown), thus said disc plate 21 and parallel ring 22 are tied together for simultaneous movement, and maintained in parallel spaced relationship.

Figure 3:
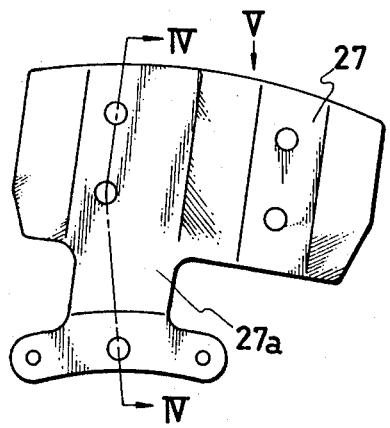
FIG. 3 is a perspective view of the leaf spring of this invention.
Figure 4:
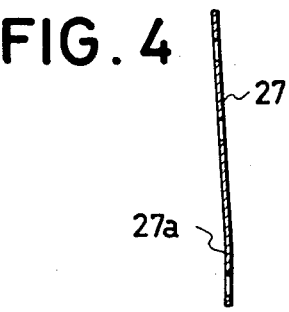
FIG. 4 is a view taken along the line IV—IV of FIG. 3.
Figure 5:
FIG. 5 is a view seen from arrow V of FIG. 3.

At the outer periphery of the disc plate 21, there are connected a plurality of leaf springs 27 by means of rivets 28. The springs 27 are of a generally rectangular shape as seen in FIGS. 3 and 5, and are arranged alternately in spaced end-to-end order to provide approximately continuous annular cushion means between a pair of friction facings 29 and 30, and are beforehand slightly inclined at the base portion 27a thereof towards said pressure plate 12 as shown in FIGS. 1, 2, 4 and 5. As seen in FIG. 1 the bending point 27a is located a distance from the hub 17 at least about one-half the distance from the hub to the outer perimeter of the clutch disc 10.

The frictional facings 29 and 30, which may be made of any suitable friction material, are adapted under clutch-engaging pressure to be packed between said flywheel 11 and said axially shiftable pressure plate 12, and are secured to the leaf springs 27 by rivets 31 provided in respective bores of said facings; on the clutch disengaging, the two facings 29 and 30 are slightly inclined towards the pressure plate 12 as clearly shown in FIG. 1.

A conventional diaphragm spring 32 having a number of radially and inwardly directing tongues 32a is rigidly connected through the intermediary of pivot rings 33 and 34 with the strap at its base side and the cover 13 at the zone of its recess 35 by means of rivets 36 which pass commonly through respective rivet holes 37 and 38, the latter being bored through said diaphragm spring 32 as shown in FIGS. 1 and 2.

A retracting spring 39 fixed to a shoulder 12a of the pressure plate 12 by means of a screwbolt 40 has a substantially looped cross section as shown in FIG. 1 or 2, the free end of the spring 39 being kept in a pressure and resilient contact with the peripheral zone of diaphragm spring 32, thereby resiliently urging the latter against the shoulder 12a, thus a pressure contact between the both being normally maintained.

On a stationary tube shaft 41 provided concentrically with the drive shaft 20, a slide 42 is slidably mounted so as to move to and fro as hinted by a double-headed arrow I, and mounts in turn rigidly conventional release bearing means 43 which is connected with a clutch pedal (not shown) fitted commonly at the operator's seat for being controlled at the will of the operator, as conventionally.

These driving and driven arrangements relative to the clutch assembly are highly and conventionally known to those skilled in the art and thus no further detailed description will be necessary to set forth for better understanding of the present invention.

In operation, when it is assumed that the automotive engine is running, motion is transmitted therefrom through the flywheel 11 to clutch disc 10, thence through torsion dampers 23, flange 18, and splined bore 19 to the main drive shaft 20.

Rotation is similarly transmitted from the flywheel 11 to the clutch cover 13 on account of the direct coupling thereof with the former, thence through fixing rivet 36 and retracting spring 39 to pressure plate 12 which is therefore kept in rotation at the same speed with that of the rotating flywheel 11. Therefore, the clutch disc is not subject to a severe rotary friction by the flywheel or pressure plate. Said friction facings 29 and 30 are packed between the flywheel 11 and pressure plate 12 against the inclinating force due to the inclined leaf springs 27, and are erected perpendicularly to the drive shaft 20 as seen in FIG. 2.

When it is desired to disconnect the clutch from the engine side under these operating conditions, the vehicle operator must depress the clutch pedal down so as to advance said slide 42, together with the release bearing means 43, along the tube shaft 41, until the bearing 43 is brought into contact with tongues 32a of the diaphragm spring 32.

With further exerted foot pressure upon the clutch pedal, said release bearing 43 is further advanced in the left-hand direction in FIG. 1 or 2, and thus a further accentuated foot force is applied to the tongues 32a which cause said diaphragm spring 32 to swivel about pivot rings 33 and 34 as the center and urging pressure is therefore transmitted by the diaphragm spring 32 through the retracting spring 39 and bolts 40 to pressure plate 12 which is thus moved axially in the right-hand direction when seen in FIG. 1 or 2. Therefore, the pressure plate 12 is retracted from the pressure-engaging position with the friction facings 29 and 30, and the inclined friction facings are automatically released from said flywheel 11 without any drag.

More particularly, upon initial engagement, an inner periphery portion 29a of the one facing 29 is brought in contact with said flywheel 11, while an outer periphery portion 30a of the other facing 30 is brought in contact with the pressure plate 12. On the complete engagement, the frictional facings 29 and 30 are erected to fully engage the flywheel and pressure plate, and said hub 17 is moved slightly towards the pressure plate 12 as the clutch disc is swiveled about the inner periphery 29a of said one facing in the counterclockwise direction in FIG. 1 or 2. Upon clutch disengagement said hub 17 is substantially fixed to the transmission on account of the torque transmitted to the splined portion 19 of said hub 17, so that the inner periphery 29a of said one facing 29 is quickly released from the flywheel 11.

Even if the inner periphery is in contact with the flywheel 11 after clutch disengaging, the effective radius which resides from the inner periphery 29a to said splined bore 19 is so much smaller than heretofore that any torque sufficient to prevent the clutch disc 10 from disconnecting is not transmitted between the hub 17 and main drive shaft 20.

Now referring to FIG. 8, A indicates the average load curve of the leaf springs; A1 and A2 show the minimum and maximum load curves thereof, respectively.

X and Y indicate the axially moving amounts of the hub of the clutch disc, conventional and improved according to this invention, respectively.

Upon initial engagement, both hubs are shifted towards the flywheel (in the minus direction). In further engagement, the conventional hub is gradually moved in the minus direction in proportion to the shifting amount of the pressure plate towards the clutch disc while the improved hub is moved towards the pressure plate (in the plus direction) in the effective area although it is moved only a little towards minus in the ineffective area.

Figure 6:
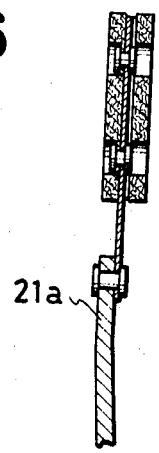
FIG. 6 is a sectional side view showing a first modified form of a clutch disc.
Figure 7:
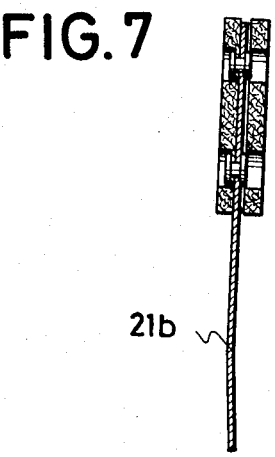
FIG. 7 is a view similar to FIG. 6 illustrating a second modified form of a clutch disc.

It will be recognized without detailed description that it is obtained the same effects as above mentioned by providing the disc plate having an inclined portion 21a on the outer periphery as shown in FIG. 6 or the disc plate served as well as the leaf springs and having an inclined portion 21b at the substantially middle periphery taken along the diameter as shown in FIG. 7.

We claim:

1. In a clutch assembly having a flywheel rotatable with an engine, a pressure plate connected to said flywheel for rotation therewith, a transmission drive shaft provided with external splines, a hub mounted on said drive shaft and provided with internal splines interengageable with said external splines and slidable with respect thereto in an axial direction, the improvement comprising, clutch disc means including a disc plate and leaf springs, said disc plate being mounted on said hub concentrically thereto, said leaf springs being securely mounted on the outer periphery of said disc plate, a pair of annular friction facings disposed between said flywheel and said pressure plate, each facing being secured to said leaf springs on each side thereof, said leaf springs and friction facings mounted thereon being inclined towards said pressure plate, the point of inclination being located outwardly from said hub a distance at least about one-half of the distance from the hub to the outer perimeter of said clutch disc, whereby said clutch disc means during engagement of the clutch assembly will cause the hub to move toward the pressure plate and during disengagement will cause a rapid disengagement of the friction facings from said flywheel due to delayed return movement of the hub on said transmission shaft because of the torque existing between said splines.

2. In a clutch assembly as claimed in claim 1 wherein the leaf springs are inclined toward said pressure plate adjacent their inner peripheral edges.

3. In a clutch assembly as claimed in claim 1 wherein said disc plate is inclined toward said pressure plate adjacent its outer peripheral edge.

* * * * *